US006801135B2

(12) United States Patent
Schultz et al.

(10) Patent No.: US 6,801,135 B2
(45) Date of Patent: Oct. 5, 2004

(54) WEBSERVER-BASED WELL INSTRUMENTATION, LOGGING, MONITORING AND CONTROL

(75) Inventors: Roger L. Schultz, Aubrey, TX (US); Harold K. Beck, Copper, TX (US); Robert K. Michael, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 564 days.

(21) Appl. No.: 09/862,936

(22) Filed: May 22, 2001

(65) Prior Publication Data

US 2002/0018399 A1 Feb. 14, 2002

(51) Int. Cl.[7] .................................................. G01V 3/00
(52) U.S. Cl. ....................... 340/853.1; 702/188; 367/81
(58) Field of Search ........................... 340/853.1, 853.2, 340/853.3, 854.9; 702/188; 367/81

(56) References Cited

U.S. PATENT DOCUMENTS 5,941,305 A 8/1999 Thrasher et al.
5,959,547 A * 9/1999 Tubel et al. ............. 340/853.2
5,978,749 A * 11/1999 Likins et al. ............... 702/158
6,061,603 A 5/2000 Papadopoulos et al.
6,670,880 B1 * 12/2003 Hall et al. .................. 336/132

FOREIGN PATENT DOCUMENTS

EP 0371660 A1 6/1990
GB 2317406 A 3/1998
GB 2321973 A 8/1998

OTHER PUBLICATIONS

International Preliminary Examination Report for PCT Application No.: PCT/US00/14750.

S. Murchie, et al., "Innovations in Global Electronic Data Delivery", SPE 56686, dated Oct. 3, 1999.

G. P. Corser, et al., "Field Test Results for a Real–Time Intelligent Drilling Monitor", SPE 5922 (dated) Feb. 23, 2000.

* cited by examiner

*Primary Examiner*—Timothy Edwards
(74) *Attorney, Agent, or Firm*—Marlin R. Smith

(57) ABSTRACT

Apparatus and methods for webserver-based well instrumentation, logging, monitoring and control provide convenience and economy in well site and off-site operations. In a described embodiment, a well tool includes a webserver connected to a sensor and an actuator of the tool. In response to a condition sensed by the sensor, a person utilizing a network to access a web page supported by the webserver at a remote location may operate the actuator to control operation of the well tool.

59 Claims, 8 Drawing Sheets

104 140 141 142 106 138 108 132 130 114 134 112 122 116 124 126 136 118 128 110 120 150 144 148 146

10
24

26
22
16
12
14
20
18

34
28
32
30
24
26
10
22

12,
14

152
154
156
184
158
160
180
184
172
174
170
176
162
182
186
178
176
164
188
178
166
190
168

WEBSERVER-BASED WELL INSTRUMENTATION, LOGGING, MONITORING AND CONTROL

CROSS-REFERENCE TO RELATED APPLICATION

This application claims the benefit under 35 USC § 119 of the filing date of PCT Application No. PCT/US00/14750, filed May 26, 2000, the disclosure of which is incorporated herein by this reference.

BACKGROUND

The present invention relates generally to operations performed and equipment utilized in conjunction with subterranean wells and, in an embodiment described herein, more particularly provides well instrumentation, logging, monitoring and control using webservers.

In many situations it is advantageous to be able to remotely monitor and control aspects of a subterranean well. For example, well tools positioned in the well might be operated without requiring intervention into the well and without requiring the use of certain equipment, such as pumps, to apply pressure to the tools, etc. Well conditions might be monitored at a remote location, so that personnel do not have to physically travel to the well, and so that well data is available when needed at any location. Complex and/or hazardous operations, such as drill stem tests, might be monitored and controlled by a person or persons having special expertise in these operations at a remote location. These are but a few of the advantages of remotely monitoring and controlling a well.

Past attempts to provide such remote monitoring and control have only gone so far. That is, these attempts have fallen short of the goal of providing world-wide access to well data and to the tools needed to actually control equipment at the well. For example, some attempts to provide remote well monitoring and control have required that an operator utilize a specially configured control terminal which communicates via a proprietary system, etc.

What is needed is a well monitoring and control system which enables an operator anywhere in the world to monitor well data and/or to control equipment at the well using readily available facilities, such as a standard computer or terminal and a connection to the Internet or other network. A similar system might also be used to perform well tool diagnostics or other operations.

SUMMARY

In carrying out the principles of the present invention, in accordance with an embodiment thereof, a well monitoring and control system is provided which utilizes the Internet or other network to permit remote monitoring and control of aspects of the well. A webserver included in a well tool supports a website accessible by an operator having a connection to the Internet or other network.

In one aspect of the present invention, a well tool is provided that includes a sensor and/or an actuator. The sensor and/or actuator is connected to a webserver of the tool. The webserver is connected to a network. If a sensor is used, signals generated by the sensor are accessible at a remote location via the network. If an actuator is used, the actuator is controllable from the remote location via the network.

Multiple well tools may be used in a well, in which case each well tool may include a webserver and a sensor and/or actuator. The well tools may be independently monitored and/or controlled via a network connected to the webserver.

In another aspect of the present invention, surface equipment associated with a well may be monitored and/or controlled from a remote location using a system provided herein. An item of surface equipment may include a webserver connected to a sensor and/or actuator. The webserver is connected to a network. If a sensor is used, signals generated by the sensor are accessible at a remote location via the network. If an actuator is used, the actuator is controllable from the remote location via the network.

In yet another aspect of the present invention, logging tools may be monitored and/or controlled from a remote location using a system provided herein. A logging tool may include a webserver connected to a sensor and/or actuator. The webserver is connected to a network. If a sensor is used, signals generated by the sensor are accessible at a remote location via the network. If an actuator is used, the actuator is controllable from the remote location via the network.

In still another aspect of the present invention, a well tool may be tested from a remote location using a system and method provided herein. A webserver of the tool is connected to a network. One or more sensors may sense fluid properties proximate the tool and/or sense the position of one or more structures of the tool, etc. The webserver and sensors are connected to a test control module, which is also connected to one or more items of test equipment. The item of test equipment maybe operated remotely, for example, to apply pressure to the tool, via the network.

In a further aspect of the present invention, various methods may be utilized for communicating between the webserver and the network. A fiber optic line, a wireline, acoustic telemetry or a satellite uplink may serve as a part of a communication path between the webserver and the network. If a fiber optic line is used, the present invention provides a cable uniquely suited for use in a subterranean well.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
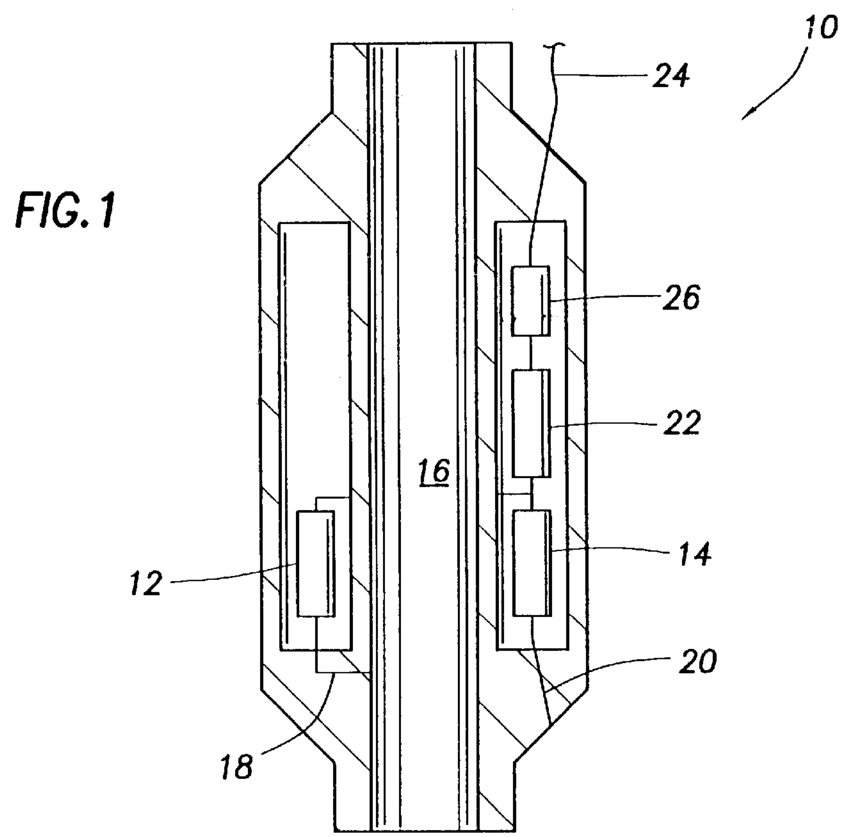
FIG. 1 is a schematic view of a well tool embodying principles of the present invention.

Representatively illustrated in FIG. 1 is a well tool 10 which embodies principles of the present invention. In the following description of the well tool 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

As depicted in FIG. 1, the well tool 10 facilitates monitoring of well conditions from a remote location. However, it is to be clearly understood that other types of well tools may embody principles of the present invention. The well tool 10 may be appropriately configured for interconnection in a tubular string in a well by, for example, providing threaded connections at each end of the tool.

The well tool 10 includes two pressure and temperature sensors 12, 14. Preferably, the sensors 12, 14 are conventional quartz pressure and temperature gauges, although other types of sensors may be used in the well tool 10. The sensor 12 is connected to an internal flow passage 16 of the well tool 10 via a fluid passage 18, so that properties of fluid in the flow passage 16 may be sensed by the sensor. The sensor 14 is connected to the exterior of the well tool 10 via a fluid passage 20, so that properties of fluid external to the well tool may be sensed by the sensor. Thus, the pressure and temperature of fluids internal and external to the well tool 10 may be sensed by the sensors 12, 14. Of course, additional or alternate sensors may be provided in the well tool 10 to sense other properties, such as resistivity, water cut, density, etc.

The sensors 12, 14 are connected to a webserver 22. Preferably, the webserver 22 is an integrated circuit or "chip", such as an Agilent model 11501, which is capable of supporting a web page on the Internet or other network. The Agilent model 11501 webserver is a network capable application processor which conforms to the IEEE 1451.2 industry standard. In this manner, signals generated by the sensors 12, 14 are accessible on the web page, so that a person at a remote location may conveniently monitor the signals by merely going to the web page on the network.

A cable 24 provides a communication path between the well tool 10 and a remote location when the tool is positioned in a well. In the embodiment representatively illustrated in FIG. 1, the cable 24 includes one or more fiber optic lines for communication between the webserver 22 and the remote location. Accordingly, the well tool 10 includes a converter 26 for converting electrical signals generated by the webserver 22 into optical signals for transmission via the fiber optic line(s) of the cable 24. Preferably, the converter 26 is a Versitron model M7235(10 base T) or M7245(10 base T), which utilize the conventional ethernet communication standard. However, it is to be clearly understood that the webserver 22 could communicate directly with the remote location via an electrical conductor, another converter could be used and another communication standard could be used, without departing from the principles of the present invention.

Figure 2:
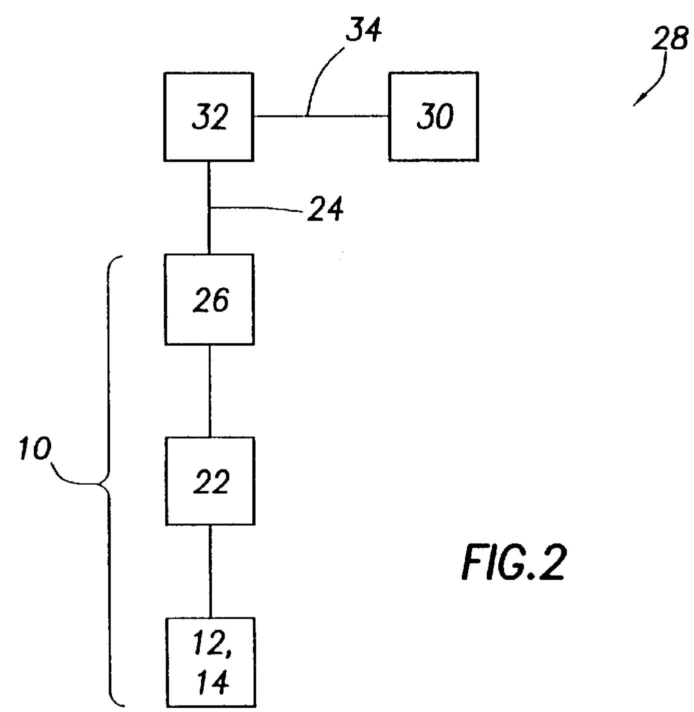
FIG. 2 is a schematic block diagram of a method of communicating between the well tool and a network, the method embodying principles of the present invention.

Referring additionally now to FIG. 2, a schematic block diagram of a method 28 of communicating between the well tool 10 and a network 30 is representatively illustrated, the method embodying principles of the present invention. In FIG. 2, it may be seen that the cable 24 extends to another converter 32, which is in communication with the network 30 via a further communication path 34. The converter 32 may be the same type as the converter 26, but the converter 32 preferably converts optical signals on the cable 24 to electrical signals for transmission on the communication path 34, which preferably includes one or more electrical conductors.

The communication path 34 from the converter 32 to the network 30 may be located, for example, at the earth's surface. The network 30 may be accessed via a computer terminal or other device, etc. (not shown), in which case the communication path 34 would be connected to the device, and the device would be connected to the network. Thus, signals generated by the sensors 12, 14 are communicated to the webserver 22, the webserver incorporates the signals (or a translated form thereof) into a web page supported by the webserver, and the webserver communicates with the network 30 using the converters 26, 32 and communication paths 24, 34. Of course, if it is not desired to use optical signals, then the converters 26, 32 may not be used.

Referring additionally now to FIGS. 3–7, various configurations of cables that may be used for the cable 24 in the well tool 10 and method 28 described above are representatively illustrated. Of course, other types of cables may be used, without departing from the principles of the present invention. Each of the illustrated cables utilizes a fiber optic package 36 commercially available from ArmorTech. In this package 36, multiple fiber optic lines 38 are hermetically sealed within a tubular material 40. Preferably, the material 40 is metallic for strength and durability, for example, the material maybe steel or inconel.

Figure 4:
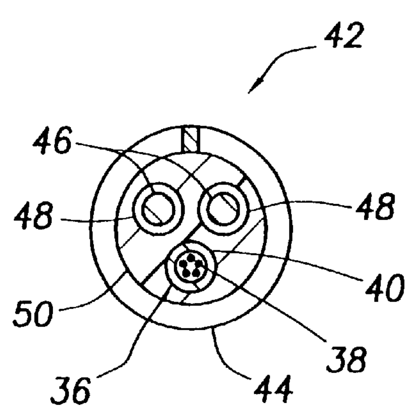
FIG. 4 is a cross-sectional view of the first cable, taken along line 4—4 of FIG. 3.
Figure 3:
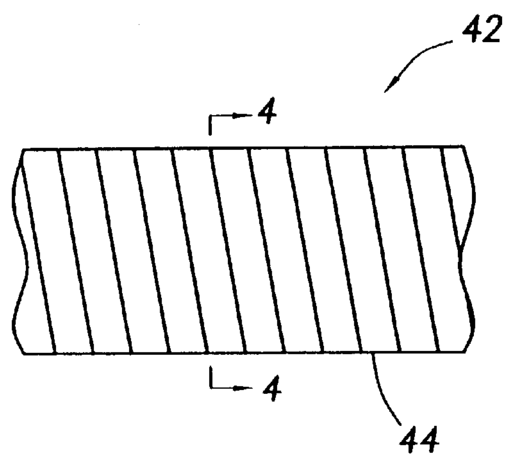
FIG. 3 is a partial side elevational view of a first cable for use with the well tool of FIG. 1, the first cable embodying principles of the present invention.

A first cable 42 is depicted in FIGS. 3 & 4, with FIG. 4 illustrating a cross-section of the cable taken along line 4—4 of FIG. 3. In FIG. 3 it may be seen that the cable 42 includes a helically wrapped outer protective material 44. The material 44 may be steel or another suitably strong and abrasion resistant material.

In FIG. 4 it may be seen that the cable 42 further includes two electrical conductors 46, which may be used for communication, for supplying power to the well tool 10 for operation of the converter 26 and sensors 12, 14, or for other purposes. Each conductor 46 is supplied with insulation 48. A filler material 50 occupies the spaces between the outer protective material 44 and the fiber optic package 36 and the conductors 46 and insulation 48. The filler material 50 may be any suitable material, such as rubber, fluorocarbon, etc., and may be a dielectric material.

Figure 5:
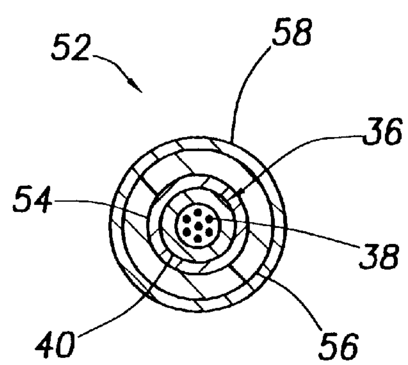
FIG. 5 is a cross-sectional view of a second cable embodying principles of the present invention.

A cross-section of another cable 52 is depicted in FIG. 5. The cable 52 includes the fiber optic package 36 and a tubular conductor 54 disposed about the fiber optic package.

The conductor 54 is, in turn, enveloped by a filler material 56, which may be similar to the filler material 50 described above. A tubular outer protective material 58 outwardly surrounds the remainder of the cable 52. The protective material 58 may be made of steel or another suitably strong and durable material, and the protective material may be in a solid tubular form, or may be helically wrapped as described above for the protective material 44.

Figure 6:
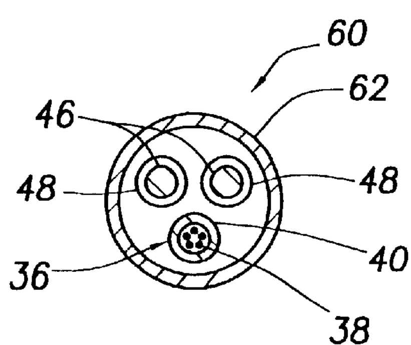
FIG. 6 is a cross-sectional view of a third cable embodying principles of the present invention.

A cross-section of yet another cable 60 is depicted in FIG. 6. The cable 60 is similar in many respects to the cable 42 described above, and the same reference numbers are used in FIG. 6 to indicate similar elements. However, the cable 60 differs from the cable 42 at least in part in that the cable 60 does not include the filler material 50, and an outer tubular protective material 62 of the cable 60 is depicted as being in a solid tubular form, rather than being helically wrapped as described above for the protective material 44. Of course, the protective material 62 could be helically wrapped, without departing from the principles of the present invention.

Figure 7:
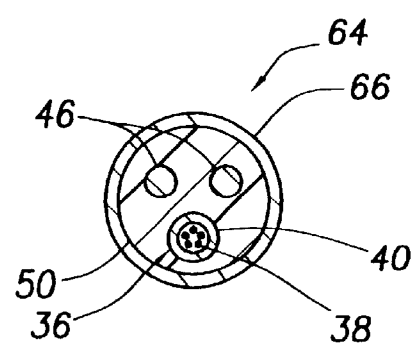
FIG. 7 is a cross-sectional view of a fourth cable embodying principles of the present invention.

A cross-section of still another cable 64 is depicted in FIG. 7. The cable 64 is similar in many respects to the cable 42 described above, and the same reference numbers are used in FIG. 7 to indicate similar elements. However, the cable 64 differs from the cable 42 at least in part in that the conductors 46 do not have the insulation 48 disposed thereabout, and an outer tubular protective material 66 of the cable 64 is depicted as being in a solid tubular form, rather than being helically wrapped as described above for the protective material 44. Of course, the protective material 66 could be helically wrapped, without departing from the principles of the present invention.

Figure 8:
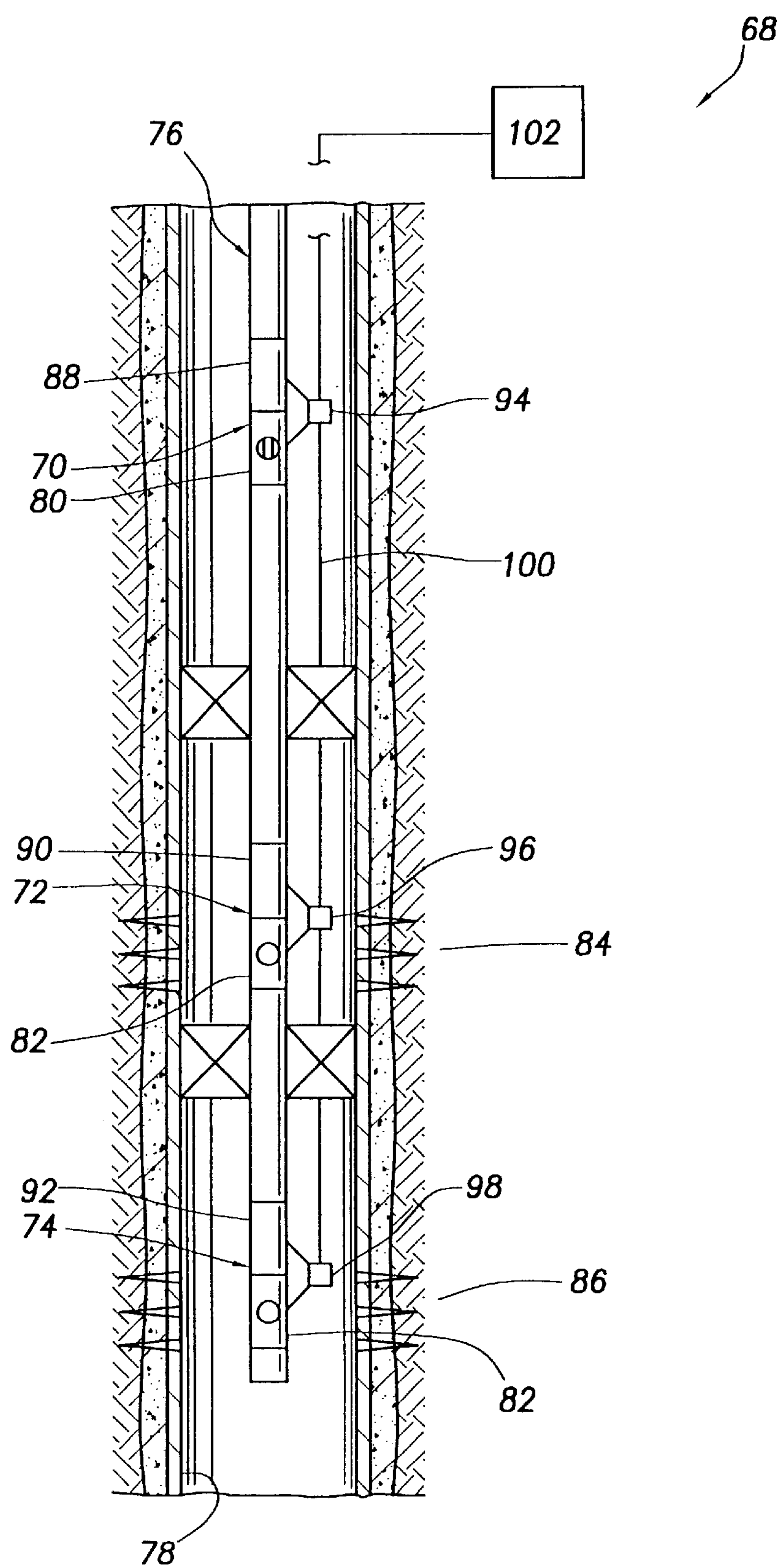
FIG. 8 is a schematic partially cross-sectional view of a well tool monitoring and control system embodying principles of the present invention.

Referring additionally now to FIG. 8, a well monitoring and control system 68 embodying principles of the present invention is schematically and representatively illustrated. In the system 68, multiple well tools 70, 72, 74 are interconnected in a tubular string 76 positioned in a wellbore 78. Each of the well tools 70, 72, 74 includes a flow control device, with the well tool 70 including a flow control device 80 operative to control the flow of fluid through the tubular string 76, and each of the well tools 72, 74 including a flow control device 82 operative to control the flow of fluid between the wellbore 78 and respective earthen formations or zones 84, 86 intersected by the wellbore.

Each of the well tools 70, 72, 74 further includes a respective actuator 88, 90, 92 for operating the corresponding flow control device 80 or 82. The actuators 88, 90, 92 maybe electrically, hydraulically or otherwise operated.

Each of the well tools 70, 72, 74 also includes a respective webserver 94, 96, 98. In FIG. 8, each of the webservers 94, 96, 98 is shown schematically alongside the respective actuator 88, 90, 92 and flow control device 80 or 82, in order to conveniently illustrate connections between the webservers, actuators and devices, but it should be understood that in actual practice the webservers would be positioned internally, rather than externally, in the well tools 70, 72, 74.

Figure 14:
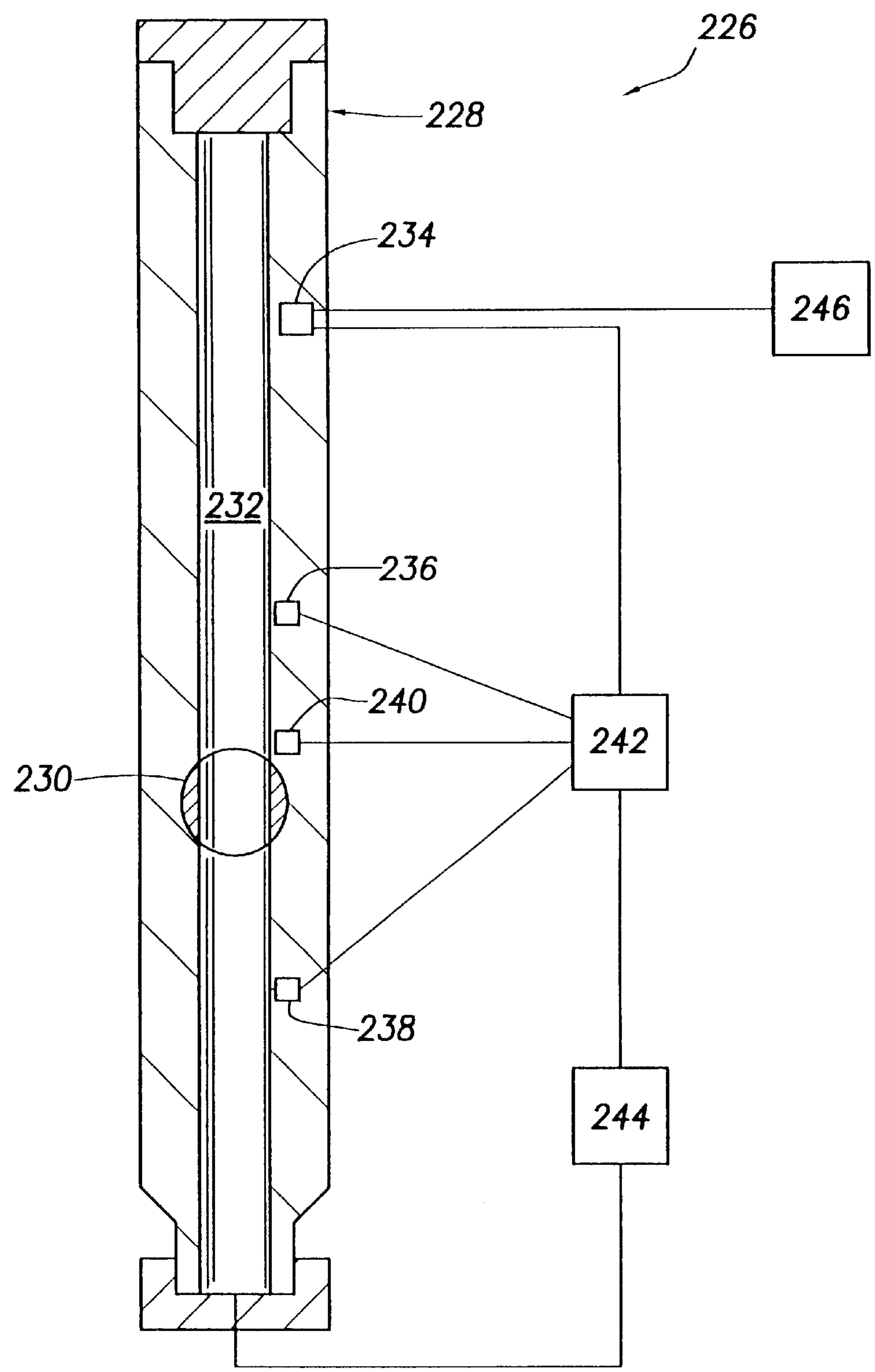
FIG. 14 is a schematic partially cross-sectional view of a method of remotely testing a well tool.

The webserver 94 is connected to a sensor (not shown) of the flow control device 80. For example, the device 80 may include a pressure and temperature sensor, such as the sensors 12, 14 described above. Alternatively, the device 80 may include a position sensor for sensing the position of a closure structure of the device to indicate whether the device is open or closed to fluid flow therethrough. Examples of the use of such sensors are depicted in FIG. 14 and described more fully below.

The webserver 94 is further connected to the actuator 88 for controlling operation of the actuator. For example, if the actuator 88 is electrically operated, the webserver 94 may be connected to a switch (not shown) or other electrical component of the actuator. As another example, if the actuator 88 is hydraulically operated, the webserver 94 may be connected to an electrically operated pilot valve (not shown) or other component of the actuator.

In a similar manner, each of the webservers 96, 98 is connected to one or more sensors of the corresponding flow control device 82 and to the associated actuator 90, 92. Thus, the webserver 96 is used to monitor the sensor(s) of the corresponding device 82 and to control operation of the actuator 90, and the webserver 98 is used to monitor the sensor(s) of the corresponding device 82 and to control operation of the actuator 92.

Each of the webservers 94, 96, 98 is connected via a communication path, such as a cable 100, to the Internet 102 or another network. Of course, other types of communication paths may be used, such as acoustic telemetry, electromagnetic telemetry, etc., for connecting the webservers 94, 96, 98 to the Internet 102.

Each of the webservers 94, 96, 98 supports a web page on the Internet 102. Thus, a person at a remote location can go to a web page supported by one of the webservers 94, 96, 98 and monitor signals generated by the sensor(s) of the corresponding well tool 70, 72, 74. In addition, a corresponding one of the actuators 88, 90, 92 may be controlled via the respective web page to operate the associated device 80 or 82. Thus, in the system 68, a person with a connection to the Internet 102 at a remote location may, for example, monitor a pressure drop across or a flow rate through the device 80 and, based on this information, operate the actuator 88 to adjust the pressure drop or flow rate, or to close the device, as desired.

Figure 9:
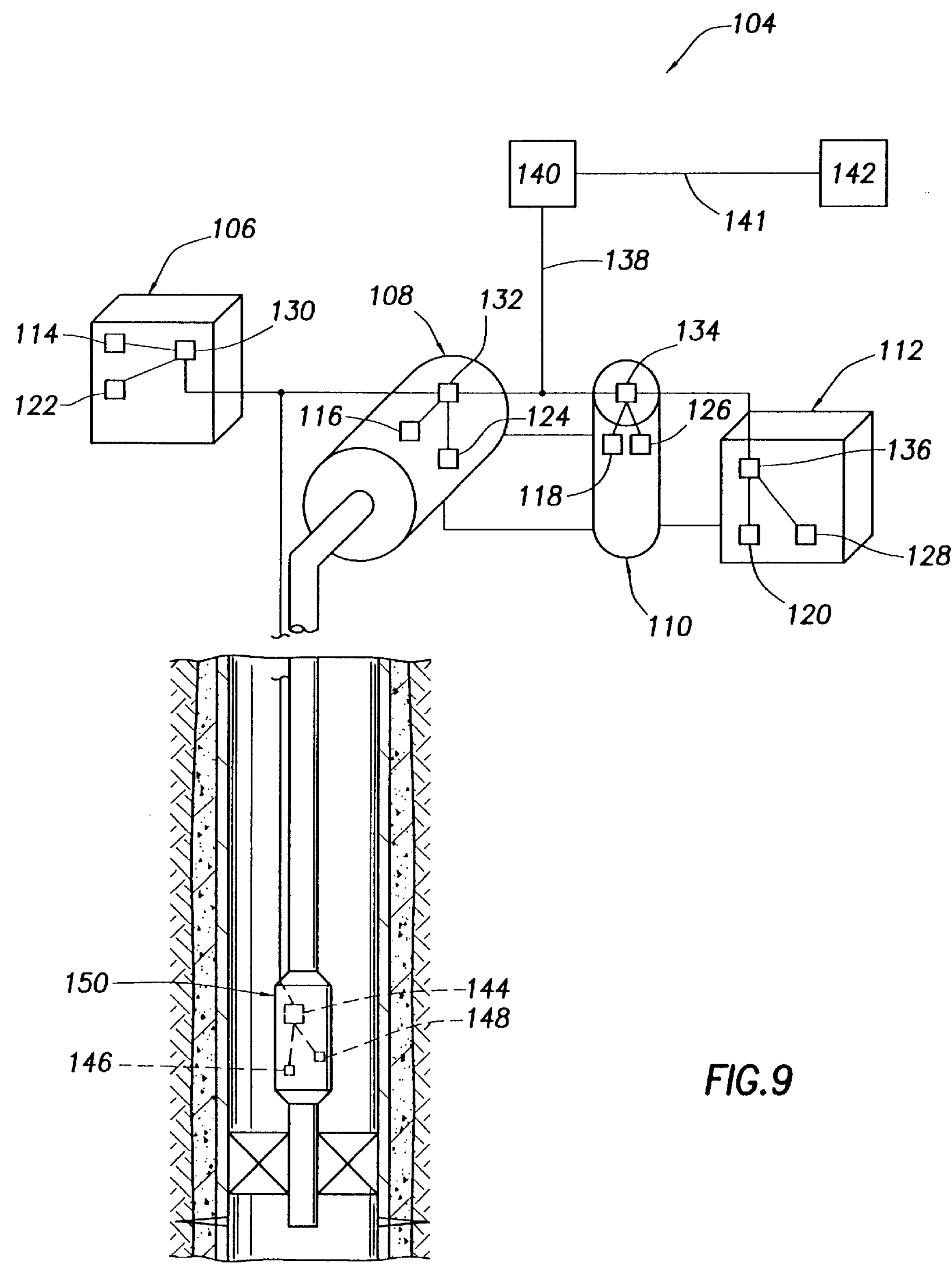
FIG. 9 is a schematic partially cross-sectional view of a surface equipment monitoring and control system embodying principles of the present invention.

Referring additionally now to FIG. 9, a surface equipment monitoring and control system 104 embodying principles of the present invention is schematically and representatively illustrated. In the system 104, multiple items of surface equipment 106, 108, 110, 112 are positioned at the earth's surface. The surface equipment 106, 108, 110, 112 may be any type of surface equipment used in conjunction with operations performed at a wellsite. For example, the surface equipment 106, 108, 110, 112 may include separators, burners, pumps, chokes, blowout preventers, valves, etc., for use in operations such as drill stem tests.

Each of the items of surface equipment 106, 108, 112 includes at least one respective sensor 114, 116, 118, 120 and at least one respective actuator 122, 124, 126, 128. However, it is to be clearly understood that it is not necessary in keeping with the principles of the present invention for every item of surface equipment in a system to include both an actuator and a sensor. For example, an item of surface equipment could include only a sensor or only an actuator, or another element which may be monitored or controlled.

Each of the items of surface equipment 106, 108, 110, 112 also includes a respective webserver 130, 132, 134, 136. Each of the webservers 130, 132, 134, 136 is connected to the respective sensor 114, 116, 118, 120 and actuator 122, 124, 126, 128 of the associated item of surface equipment 106, 108, 110, 112. Each of the webservers 130, 132, 134, 136 is further connected via a communication path 138 to a conventional intranet webserver 140 and thence via another communication path 141 to the Internet 142 or another network. The intranet webserver 140 serves as an interface between a local area network (not shown) and the Internet 142 in a manner well known to those skilled in the art. The intranet webserver 140 is also known to those skilled in the art as a "gateway webserver".

Each of the webservers 130, 132, 134, 136 supports a web page on the Internet 142. Thus, a person at a remote location can go to a web page supported by one of the webservers 130, 132, 134, 136 and monitor signals generated by the sensor 114, 116, 118 or 120 of the corresponding item of surface equipment 106, 108, 110 or 112. In addition, a corresponding one of the actuators 122, 124, 126, 128 may be controlled via the respective web page to operate the associated item of surface equipment 106, 108, 110, 112. Thus, in the system 104, a person with a connection to the Internet 142 at a remote location may, for example, monitor one of the sensors 114, 116, 118, 120 and, based on this information, operate the corresponding actuator 122, 124, 126, 128 to adjust an operating parameter of the associated item of surface equipment 106, 108, 110, 112, as desired.

Note that the system 104 may also include a webserver 144, sensor 146 and actuator 148 included in a well tool 150 positioned in the well. For example, if the system 104 is utilized in a drill stem test operation, the well tool 150 may be a tester valve which is selectively opened or closed to permit or prevent fluid flow therethrough in pressure buildup and drawdown phases of the drill stem test. The webserver 144 is also connected to the Internet 142, so that signals generated by the sensor 146 may be monitored, and the actuator 148 maybe controlled, by a person connected to the Internet 142 at a remote location and accessing a web page supported by the webserver.

Figure 10:
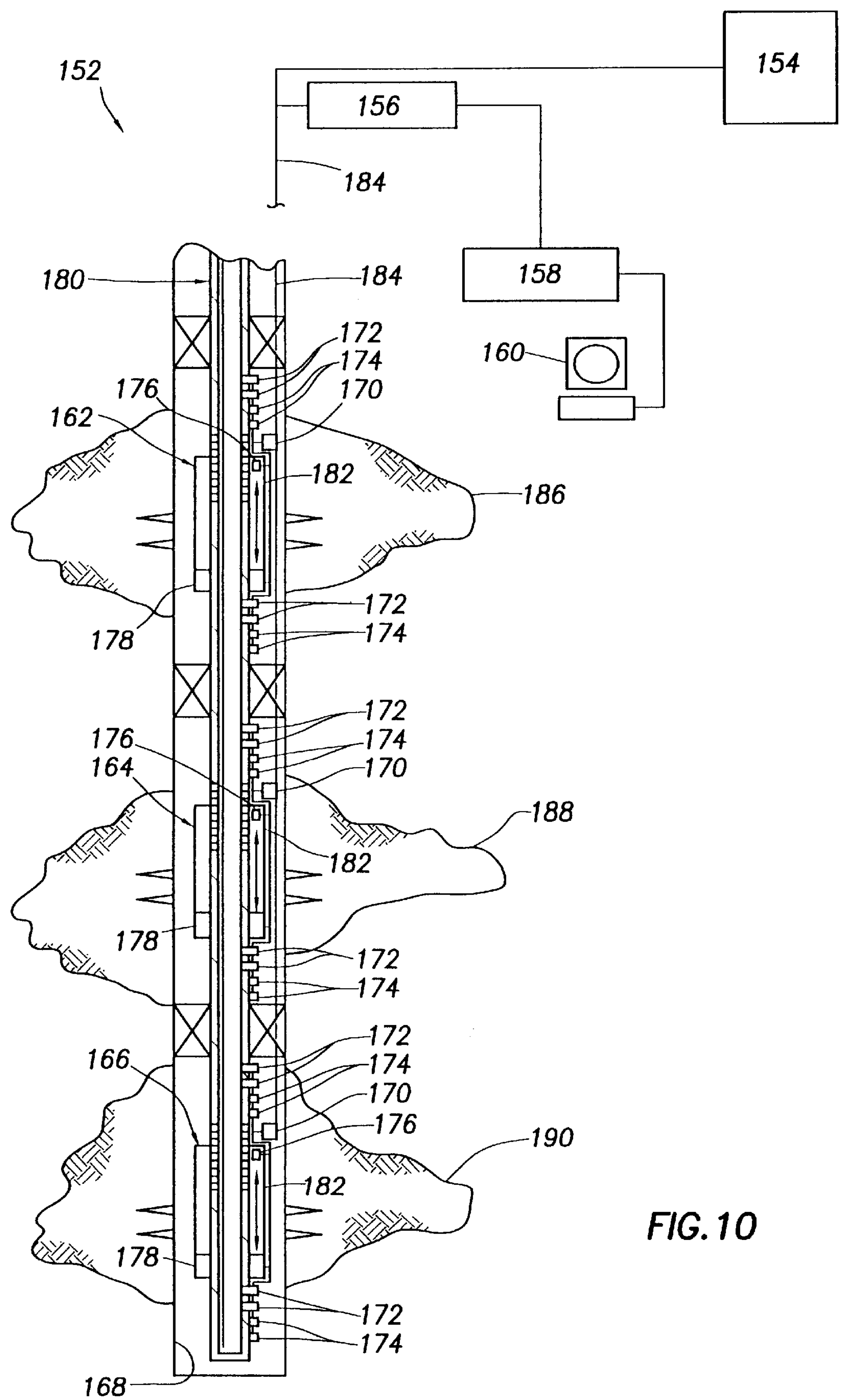
FIG. 10 is a schematic partially cross-sectional view of a well monitoring and control system embodying principles of the present invention.

Referring additionally now to FIG. 10, a well monitoring and control system 152 embodying principles of the present invention is schematically and representatively illustrated. The system 152 incorporates some of the features of the systems 68, 104 described above. Specifically, in the system 152, items of surface equipment including sensors and/or actuators connected to webservers are represented in FIG. 10 by the block 154. The webservers of the surface equipment 154 are connected to an intranet webserver 156 which is, in turn, connected to the Internet 158 or other network. A computer terminal 160 is shown connected to the Internet 158 for accessing any of the web pages supported by any of the webservers of the system 152.

The system 152 also includes multiple well tools 162, 164, 166 positioned in a wellbore 168. Each of the well tools 162, 164, 166 includes a webserver 170 connected to sensors 172, 174, 176 and actuators 178 of the well tools. The sensors 172 sense pressure and temperature of fluid internal to a tubular string 180 in which the well tools 162, 164, 166 are interconnected, and the sensors 174 sense pressure and temperature of fluid external to the tubular string. Note that a pair of the sensors 172 and a pair of the sensors 174 are positioned at upper and lower ends of each of the well tools 162, 164, 166. The sensors 176 are position sensors used for monitoring the position of a structure 182, such as a sleeve, which is displaced by the actuator 178 when the corresponding well tool 162, 164, 166 is operated. The webservers 170 are connected via a communication path 184 to the intranet server 156 and thence to the Internet 158.

The well tools 162, 164, 166 are representatively depicted in FIG. 10 as variable chokes. The actuator 178 of each well tool 162, 164, 166 displaces the sleeve 182 to produce a desired flow rate of fluid produced from a respective one of formations or zones 186, 188, 190 intersected by the wellbore 168. The position of the sleeve 182, and the pressure and temperature of fluid above, below, internal and external to each of the well tools 162, 164, 166 are readily accessible to a person at a remote location via the computer 160 connected to the Internet 158. The person at the remote location may also operate the actuator 178 of a well tool 162, 164, 166 to, for example, adjust the position of the sleeve 182 of a selected one of the well tools 162, 164, 166 to thereby adjust the rate of fluid flow therethrough.

Figure 11:
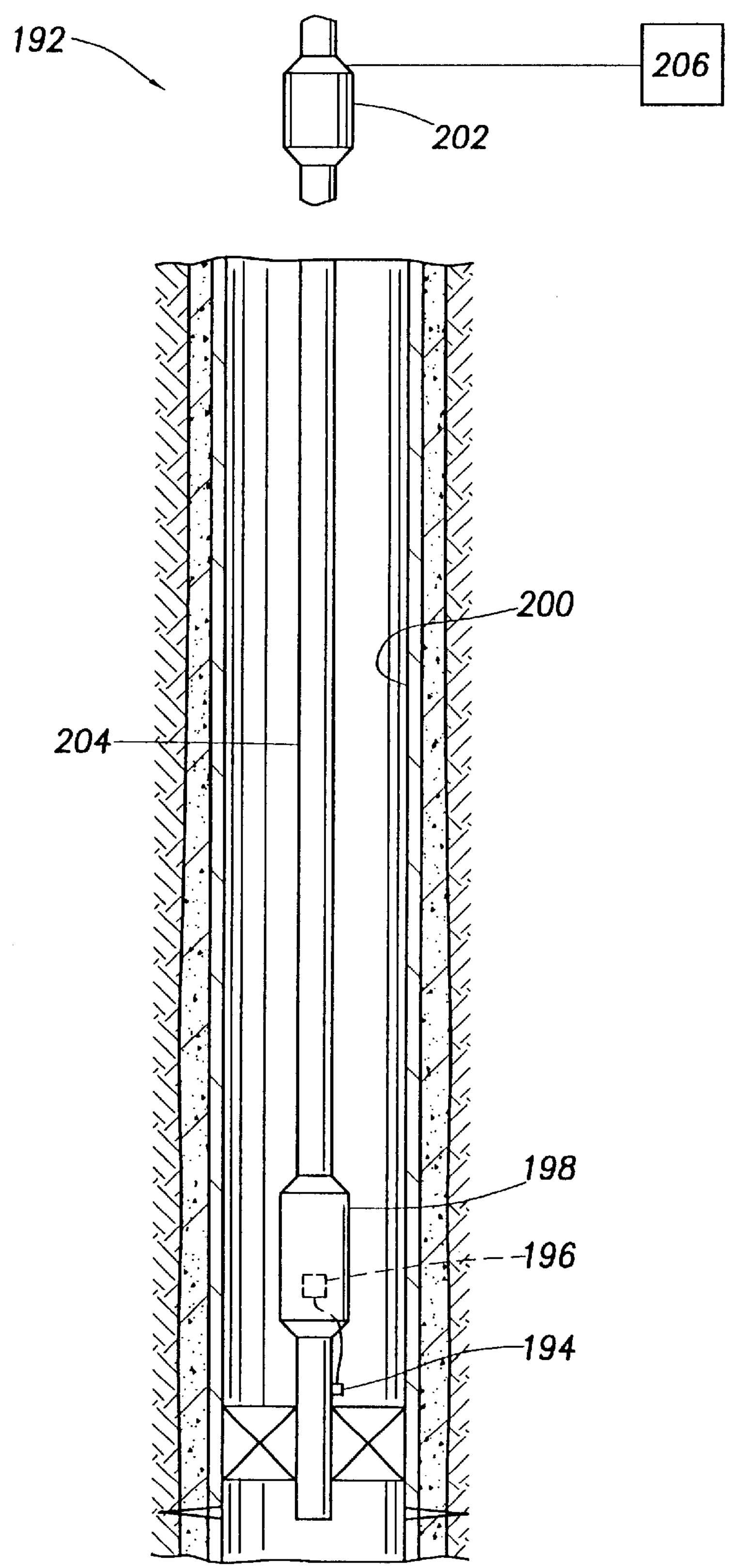
FIG. 11 is a schematic partially cross-sectional view of a well monitoring system embodying principles of the present invention.

Referring additionally now to FIG. 11, a well monitoring system 192 embodying principles of the present invention is schematically and representatively illustrated. In the system 192, a sensor 194, such as a pressure and temperature sensor, is connected to a webserver 196 included in a well tool 198 positioned in a wellbore 200. The well tool 198 communicates with another tool 202 at a remote location.

The tools 198, 202 communicate with each other using acoustic telemetry, for example, by transmitting acoustic waves through a tubular string 204 and/or fluid internal or external to the tubular string. Such acoustic telemetry is well known to those skilled in the art and may be similar to that used in the ATS (Acoustic Telemetry System) commercially available from Halliburton Energy Services, Inc. The acoustic telemetry between the tools 198, 202 serves as a part of a communication path connecting the webserver 196 to the Internet 206 or other network. Note that acoustic telemetry may serve as a part of any of the communication paths between webservers and the Internet in any of the systems and methods described herein.

Converters, such as the converters 26, 32 described above, may be used in respective ones of the tools 198, 202 so that the ethernet communication standard is used for communication between the tools. In addition, an intranet webserver, such as the intranet webservers 140, 156 described above, may be interconnected between the tool 202 and the Internet 206.

Figures 12, 13:
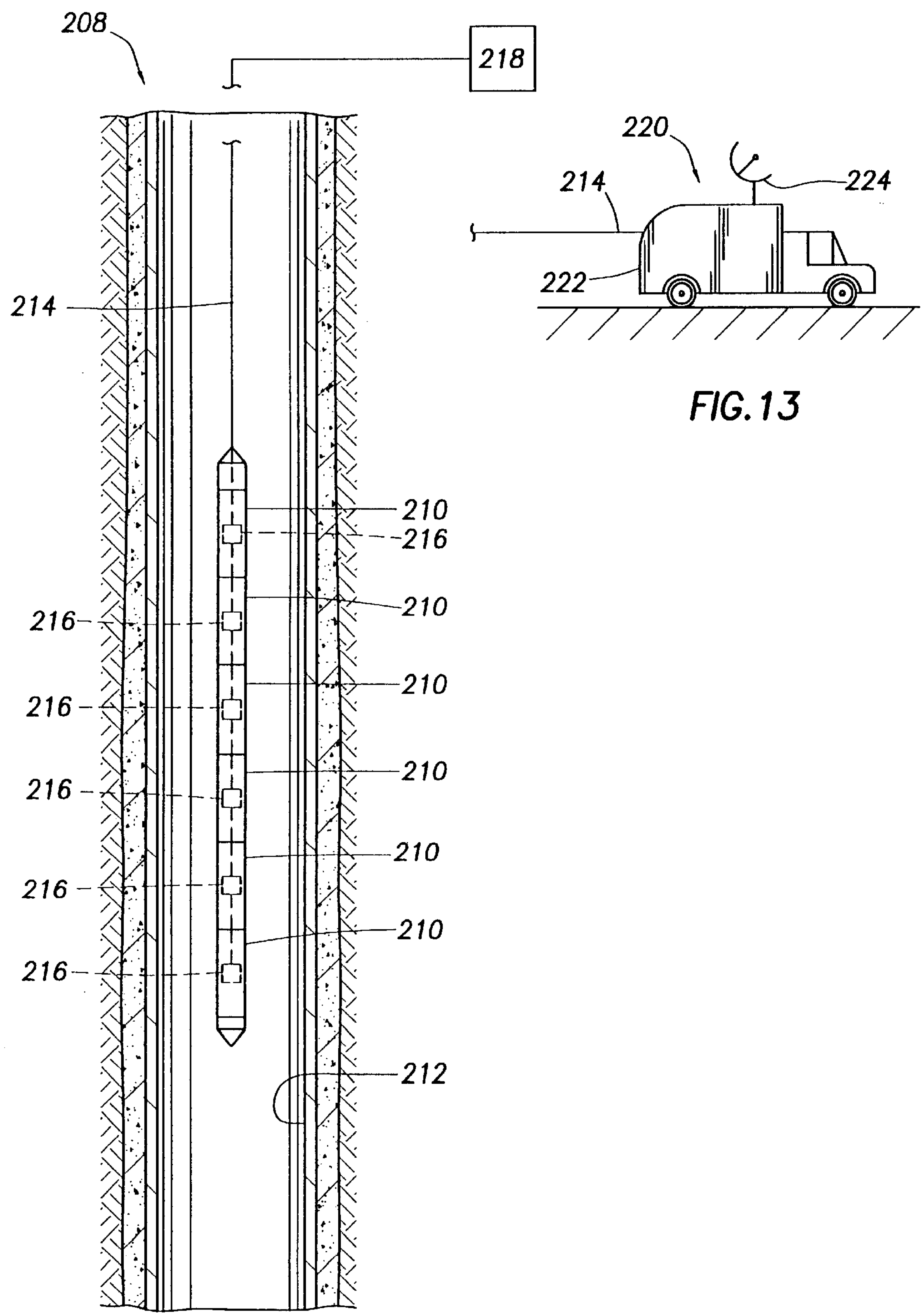
FIG. 12 is a schematic partially cross-sectional view of a well logging system embodying principles of the present invention.
FIG. 13 is a schematic view of an alternate communication method that may be used in conjunction with any of the described systems.

Referring additionally now to FIG. 12, a well logging system 208 embodying principles of the present invention is schematically and representatively illustrated. In the system 208, a string of logging tools 210 is conveyed into a wellbore 212 via a wireline 214. The wireline 214 also serves as a communication path between a webserver 216 of each logging tool and the Internet 218 or other network.

The logging tools 210 may be any type of logging tools, such as resistivity tools, gamma ray tools, magnetic field sensing tools, etc., or other types of tools, such as samplers, formation testers, video cameras, etc. The webservers 216 may be connected to sensor(s) and/or actuator(s) (not shown) of the tools 210, so that a person at a remote location with a connection to the Internet 218 may conveniently monitor signals generated by the sensors and/or operate the actuators.

Referring additionally now to FIG. 13, an alternate communication method 220 that may be used in conjunction with any of the systems described herein is schematically and representatively illustrated. The method 220 is depicted as being used with the system 208 of FIG. 12, wherein a wireline 214 serves as a part of a communication path between the webservers 216 and the Internet 218. In FIG. 13, the wireline 214 is shown extending to a wireline truck or other type of wireline rig 222.

The truck 222 is provided with a satellite uplink 224 for communication via satellite with the Internet 218 or other network. It will be readily appreciated by one skilled in the art that such a satellite uplink 224 may be used as a part of a communication path between any of the webservers described herein and the Internet or other network in any of the systems described herein.

Referring additionally now to FIG. 14, a well tool diagnostic system 226 embodying principles of the present invention is schematically and representatively illustrated. In FIG. 14, the system 226 is depicted as being utilized in conjunction with testing a well tool 228 which includes a ball valve 230 for selectively permitting and preventing fluid flow through an inner flow passage 232 of the tool. However, it is to be clearly understood that other types of well tools may be tested using the system 226, without departing from the principles of the present invention.

The well tool 228 further includes a webserver 234 and sensors 236, 238, 240. The sensors 236, 238 are pressure sensors for sensing the pressure of fluid in the flow passage 232. One of the sensors 236 is connected to the passage 232 above the ball valve 230, and the other sensor 238 is connected to the passage below the ball valve. In this manner, a pressure differential, if any, across the ball valve 230 may be detected. The sensor 240 is a position sensor used to detect the position of the ball valve 230. Of course, other types of sensors, such as a camera, flowmeter, etc., may be used in place of, or in addition to, the sensors 236, 238, 240 depicted in FIG. 14.

The sensors 236, 238, 240 and the webserver 234 are connected to a test control module 242. The control module 242 is also connected to an item of test equipment 244, such as a pump for applying pressure to the passage 232. The control module 242 acts as an interface between the sensors 236, 238, 240, the test equipment 244 and the webserver 234. Alternatively, the webserver 234 could be connected directly to the sensors 236, 238, 240 and the test equipment 244.

The webserver 234 is connected to the Internet 246 or other network. The webserver 234 supports a web page on the Internet 246, which may be accessed by a person at a remote location with a connection to the Internet. In this manner, the person at the remote location may monitor the signals generated by the sensors 236, 238, 240 and may operate the test equipment 244 to thereby test the functionality of the well tool 228 and/or diagnose a problem encountered in testing the tool.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A well tool for use in a subterranean well, the well tool comprising:

a first sensor; and a webserver connected to the first sensor, the webserver further being in communication with a network, such that signals generated by the first sensor are accessible at a remote location via the network.

2. The well tool according to claim 1, wherein the network is the Internet, and wherein the webserver supports a web page on the Internet, the signals being accessible on the web page.

3. The well tool according to claim 1, wherein the first sensor is a pressure sensor.

4. The well tool according to claim 1, wherein the first sensor is a temperature sensor.

5. The well tool according to claim 1, wherein the first sensor senses a property of fluid within the well tool.

6. The well tool according to claim 1, wherein the well tool is conveyable in the well by wireline, and wherein the webserver is connected to the network at least in part via the wireline.

7. The well tool according to claim 1, wherein the webserver is connected to the network at least in part via acoustic telemetry.

8. The well tool according to claim 1, wherein the webserver is connected to the network at least in part via a satellite uplink.

9. The well tool according to claim 1, further comprising an actuator for operating the well tool, the actuator being connected to the webserver, such that the actuator is controllable from the remote location via the network.

10. The well tool according to claim 1, wherein the first sensor senses a property of fluid external to the well tool.

11. The well tool according to claim 10, further comprising a second sensor sensing a property of fluid internal to the well tool.

12. The well tool according to claim 1, further comprising a converter for converting between optical and electrical signals.

13. The well tool according to claim 12, wherein the converter is interconnected between the webserver and a fiber optic line extending between the well tool and the remote location.

14. The well tool according to claim 13, wherein the fiber optic line serves as an ethernet communication path between the well tool and the remote location.

15. A well tool for use in a subterranean well, the well tool comprising:

an actuator for operating the well tool; and a webserver connected to the actuator, the webserver further being in communication with a network, such that the actuator is controllable from a remote location via the network.

16. The well tool according to claim 15, wherein the network is the Internet, and wherein the webserver supports a web page on the Internet, the actuator being controllable on the web page.

17. The well tool according to claim 15, further comprising:

a structure displaced by the actuator when the well tool is operated; and a position sensor operative to sense a position of the structure, the position sensor being connected to the webserver, such that signals generated by the position sensor are accessible at the remote location via the network.

18. The well tool according to claim 15, further comprising a sensor, the webserver being connected to the sensor, such that signals generated by the sensor are accessible at the remote location via the network.

19. The well tool according to claim 15, further comprising a converter for converting between optical and electrical signals, the converter being connected to the webserver.

20. The well tool according to claim 15, wherein the well tool is conveyable in the well by wireline, and wherein the webserver is connected to the network at least in part via the wireline.

21. The well tool according to claim 15, wherein the webserver is connected to the network at least in part via acoustic telemetry.

22. The well tool according to claim 15, wherein the webserver is connected to the network at least in part via a satellite uplink.

23. The well tool according to claim 15, wherein the converter is further connected to a fiber optic line extending between the well tool and the remote location.

24. The well tool according to claim 23, wherein the fiber optic line serves as an ethernet communication path between the well tool and the remote location.

25. A well monitoring and control system, comprising:

multiple well tools positioned in a wellbore, each of the well tools including a webserver; and a communication path permitting communication between each of the webservers and a network.

26. The well tool according to claim 25, wherein the network is the Internet, and wherein each of the webservers supports a web page on the Internet.

27. The system according to claim 25, wherein the wellbore intersects multiple subterranean zones, and wherein each of the well tools is a flow control device operative to control flow of fluid between the corresponding zone and the wellbore.

28. The system according to claim 25, wherein the well tools are interconnected in a tubular string positioned in the wellbore, and wherein at least one of the well tools is a flow control device operative to control flow of fluid through the tubular string.

29. The system according to claim 25, wherein at least one of the well tools includes an actuator connected to the corresponding webserver, such that the actuator is controllable from a remote location via the network.

30. The system according to claim 25, wherein the communication path includes acoustic telemetry.

31. The system according to claim 25, wherein the communication path includes a satellite uplink.

32. The system according to claim 25, wherein the communication path includes a wireline.

33. The system according to claim 32, wherein each of the well tools is conveyed in the wellbore by the wireline.

34. The system according to claim 25, wherein the communication path includes a fiber optic line.

35. The system according to claim 34, wherein the fiber optic line serves as an ethernet connection between the webserver and the network.

36. The system according to claim 34, further comprising a converter for converting between optical and electrical signals, the converter being connected at each end of the fiber optic line.

37. The system according to claim 25, wherein at least one of the well tools includes a sensor connected to the corresponding webserver, such that signals generated by the sensor are accessible at a remote location via the network.

38. The system according to claim 37, wherein the sensor senses a property of fluid internal to the at least one well tool.

39. The system according to claim 37, wherein the sensor senses a property of fluid external to the at least one well tool.

40. The system according to claim 37, wherein the sensor senses a position of a structure included in the at least one well tool.

41. A surface equipment monitoring and control system for a subterranean well, the system comprising:

multiple items of surface equipment, each of the items of equipment including a webserver; and a communication path permitting communication between each of the webservers and a network.

42. The system according to claim 41, wherein the network is the Internet, and wherein each of the webservers supports a web page on the Internet.

43. The system according to claim 41, wherein at least one of the items of equipment includes a sensor connected to the corresponding webserver, such that signals generated by the sensor are accessible at a remote location via the network.

44. The system according to claim 41, wherein at least one of the items of equipment includes an actuator connected to the corresponding webserver, such that the actuator is controllable from a remote location via the network.

45. The system according to claim 41, wherein the communication path includes an intranet webserver.

46. The system according to claim 41, wherein the intranet webserver is connected to a webserver included in a well tool positioned in a wellbore of the well.

47. The system according to claim 41, wherein the communication path includes a satellite uplink.

48. A well tool diagnostic system, comprising:

a well tool including a webserver and at least one sensor, the webserver being in communication with a network;

at least one item of test equipment; and a test control module connected to the sensor, the item of test equipment and the webserver, such that the control module is operable from a remote location via the network to control the item of test equipment and to access signals generated by the sensor.

49. The well tool according to claim 48, wherein the network is the Internet, and wherein the webserver supports a web page on the Internet, the control module being operable on the web page.

50. The system according to claim 48, wherein the webserver is in communication with the network at least in part via a satellite uplink.

51. The system according to claim 48, wherein the sensor senses a property of a fluid internal to the well tool.

52. The system according to claim 48, wherein the sensor is a position sensor for sensing a position of a structure included in the well tool.

53. The system according to claim 48, wherein the item of test equipment is a pump operable to apply pressure to the well tool.

54. A method of remotely testing a well tool, the method comprising the steps of:

providing communication between a network and a webserver of the well tool; and remotely controlling an item of test equipment connected to the well tool utilizing the network.

55. The well tool according to claim 54, wherein the network is the Internet, and wherein the webserver supports a web page on the Internet, the item of test equipment being controllable on the web page.

56. The method according to claim 54, further comprising the step of accessing signals generated by a sensor of the well tool utilizing the network.

57. The method according to claim 56, wherein the sensor generates the signals in response to sensing a property of a fluid proximate the well tool.

58. The method according to claim 54, wherein the remotely controlling step further comprises operating a test control module connected to the item of test equipment and the webserver.

59. The method according to claim 58, wherein in the remotely controlling step, the test control module is further connected to a sensor of the well tool.

* * * * *